United States Patent

[11] 3,615,848

[72] Inventor Donald D. Sibenhorn
Menomonee Falls, Wis.
[21] Appl. No. 802,769
[22] Filed Feb. 27, 1969
[45] Patented Oct. 26, 1971
[73] Assignee Isotopes, Inc.
Westwood, N.J.

[54] THERMAL CONTROL FOR FUEL CELL MODULE
9 Claims, 7 Drawing Figs.
[52] U.S. Cl. .................................................. 136/86 B
[51] Int. Cl. .................................................. Holm 27/02
[50] Field of Search ........................................... 136/86

[56] References Cited
UNITED STATES PATENTS
3,441,444 4/1969 Chesner et al. .............. 136/86

Primary Examiner—Allen B. Curtis
Attorneys—Robert C. Sullivan, Lee H. Kaiser and Robert B. Benson ABSTRACT: An assembly of fuel cells or like source of electrical power having mounted on an outer surface of the fuel cell module interleaved sets of high and low thermal emissivity surfaces, with one set of surfaces being stationary and the other set of surfaces being movable. Means are provided for sensing the thermal condition of the fuel cell module and for moving one set of surfaces relative to the other set of surfaces to vary the thermal radiation from the fuel cell module and thus to control the temperature of the fuel cell module.

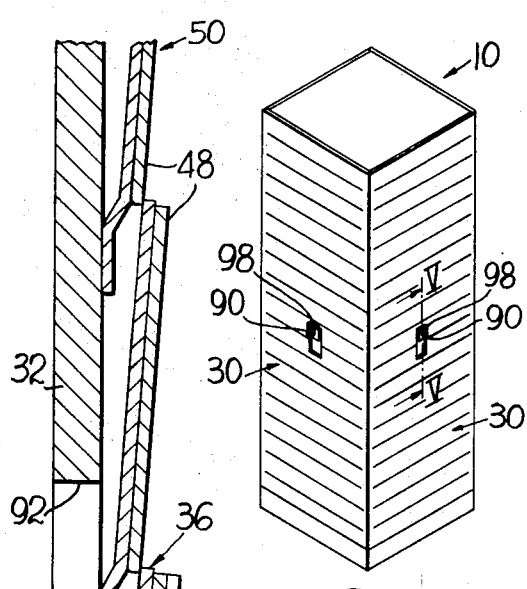
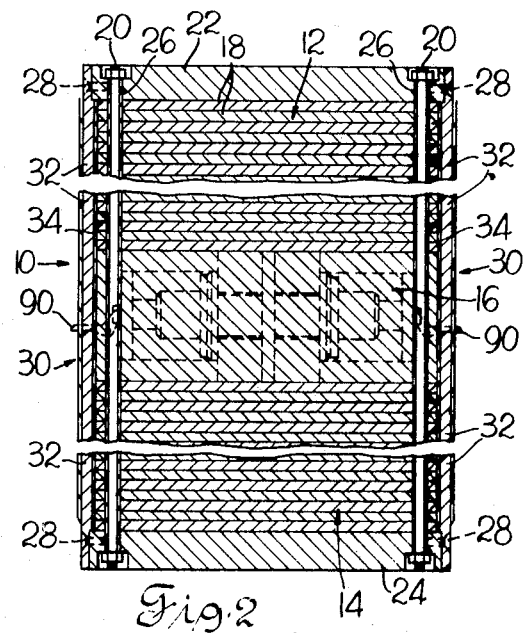
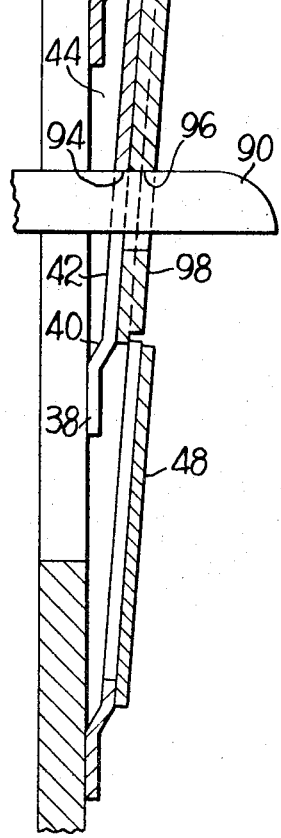
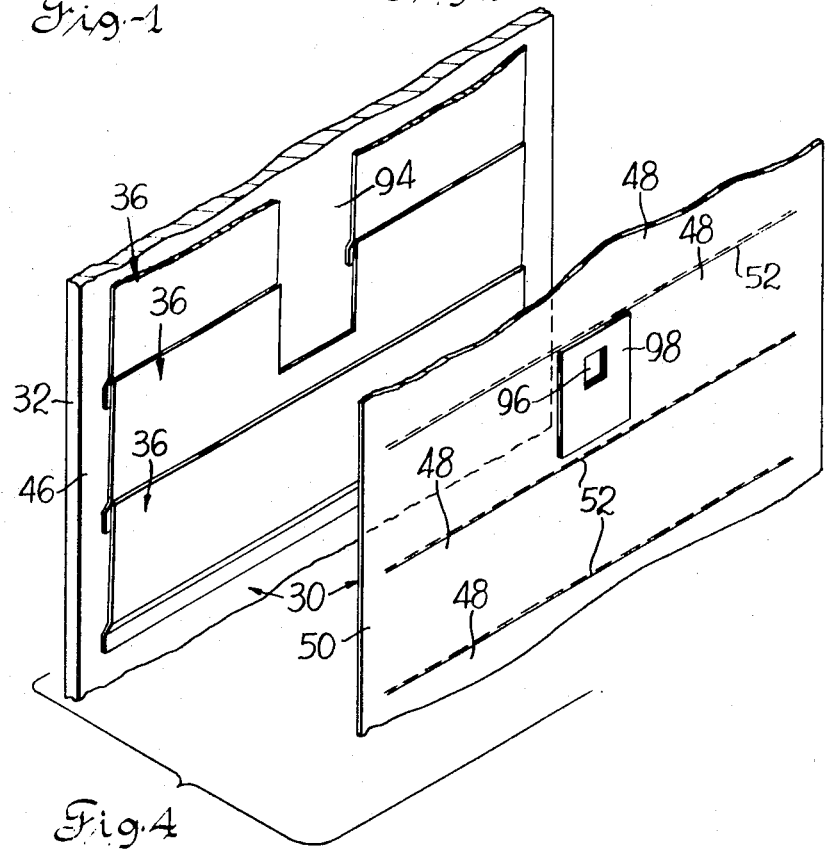

Inventor
Donald D. Eisenhorn
By Robert C. Sullivan
Attorney

THERMAL CONTROL FOR FUEL CELL MODULE

BACKGROUND OF THE INVENTION

1. Field of the Invention

This invention relates to modulating and controlling the operating temperature of fuel cells or the like. More particularly, it relates to an apparatus for and method of maintaining the operating temperature of a fuel cell or the like within a desired range.

The term "fuel cell", as used herein, refers to any of those electrochemical devices which convert the free energy of a chemical reaction directly into electrical energy. Such devices are well known in the art and the differences between various types of cells are not material to the understanding or operation of the present invention. The term "fuel cell module" refers to a number of individual fuel cells assembled together for cooperative electrical operation. A fuel cell can be categorized as a type of primary battery.

Although fuel cells are a very efficient means for converting chemical to electrical energy, the conversion is never 100 percent efficient and the inefficiency does produce some heat. Furthermore, each type fuel cell operates most efficiently within a temperature range especially selected for the electrochemical reactions, catalysts, and waste removal systems chosen for use in conjunction with that cell. For example, fuel cells that utilize the system to remove product water disclosed in U.S. Pat. application, Ser. No. 301,077, filed Aug. 9, 1963 now Pat. No. 3,370,984 are found to operate most effectively from about 195° to about 210° F.

In the vast majority of cases, the optimum temperature range for operation of any fuel cell exceeds the temperature of the surrounding environment, and the excess heat produced by the cell is disposed of by transfer to this surrounding environment. However, temperature control is needed so that only heat in excess of that required to maintain the cell near the optimum operating temperature is disposed of. Also, it becomes apparent that when starting a cold cell, conservation of waste heat is desirable until operating temperature is reached. In addition, the amount of heat produced in a fuel cell varies with the amount of electrical power being produced by the cell. Most fuel cell applications require operation over a wide range of electrical output which necessitates variation of the rate of heat dissipation to maintain optimum cell temperature.

When used as an electrical power supply for space vehicles, a fuel cell module should have the ability to operate in the earth's atmosphere during testing and prelaunch as well as in space vacuum. This requires that the fuel cell module have a variable thermal control system to compensate for the higher rate of heat dissipation in air.

2. Description of the Prior Art

In the past, temperature control of fuel cells has variously been achieved. One means of dissipating excess heat from a fuel cell stack is to provide fins about the periphery of the cells. Unfortunately, since fins must have a fixed unalterable surface area available for heat transfer, the rate of heat transfer to the surrounding environment cannot be varied. Therefore, when fins are used exclusively to provide cooling, the design must be compromised to meet the average expected operating conditions. Also, the application of such a fuel cell is limited to a relatively small range of power output and environmental conditions. When power output or environmental conditions deviate from that for which the fins are designed, the fuel cell module runs hotter or colder than the designed optimum temperature.

Another means of achieving temperature control is to circulate a fluid, either a liquid or a gas, about the fuel cell stack. Fins about the periphery of the cells are used to increase the surface area exposed to the fluid. Excess heat is transferred to this fluid.

For some applications, the cooling fluid may be air. Fans must be provided to control air circulation. Unless the temperature of the air is controlled, satisfactory operation with this type of cooling is limited to an abnormally narrow range of ambient temperature.

Other designs using a circulated fluid for thermal control of a fuel cell power supply utilize a closed-loop cooling system. The fluid must either be electrically nonconducting or electrically isolated from the fuel cell stack. After the cooling fluid is circulated about the fuel cell stack, it is then circulated through a heat-exchanger where the heat is dissipated from the fluid to the heat-exchanger surroundings. The cooled fluid is then returned to the fuel cell module to resume the process of removing excess heat from the fuel cells.

The closed-loop cooling system must contain components for circulating the fluid and controlling the pressure, temperature and flow rate of the fluid. Operation of these components requires electrical power which increases the parasitic power requirements of the fuel cell power system, and therefore, decreases the amount of usable power produced by the power system. The additional operating components of the closed-loop cooling system and the possibility of leakage decreases the reliability of the fuel cell power system and increases the cost of the system.

The fluid, tubing, controls and radiators required for this means of thermal control also add considerable weight and volume to the fuel cell power system which are undesirable factors in space applications.

When starting a cold cell, it is desirable to reach the operating temperature as rapidly as possible. Having a heat transfer fluid about the cell slows the rate of heating and delays the cell from reaching operating temperature because heat is unnecessarily dissipated into the cold heat transfer fluid contained about the cell.

Another disadvantage with this system is that when the cooling medium is a liquid, a leak in the cooling system could not only cause failure of the cooling system and the fuel cell module, but also could spill over and possibly harm nearby equipment, particularly in a space vehicle.

A considerable advance in the art of thermal control apparatus for fuel cell modules over any of the prior art previously described is disclosed in U.S. Pat. No. 3,441,44, patented Apr. 29, 1969, by Ramon J. Chesner and James C. Prestridge which discloses a fuel cell module such as a stack of series-connected cells having mounted on the outer edges of the stack a plate-backed shutter assembly having shutter louvers which are activated to open and close in response to temperature changes in the module by temperature-sensitive actuators located within the fuel cell module, thereby providing a thermal control apparatus for the module.

SUMMARY OF THE INVENTION

Accordingly, it is an object of the present invention to provide in combination with a fuel cell module or the like, a thermal control apparatus which provides an improved thermal control of the fuel cell module as compared to prior art apparatus and systems for this purpose, and which is particularly effective under space vacuum conditions.

It is another object of the invention to provide a thermal control apparatus for use with fuel cell modules or the like which controls thermal radiation of the fuel cell module or the like with fewer moving parts and fewer total parts than prior art devices and apparatus for this purpose.

It is still another object of the invention to provide a thermal control apparatus for use with fuel cell modules or the like which provides a more precise control of the degree of thermal emission or radiation from the fuel cell module or the like than is provided by prior art devices and apparatus for this purpose.

Still a further object of the invention is to provide a thermal control apparatus for fuel cell modules or the like which provides a greater range of change in thermal emissivity for fuel cell modules or the like than prior art devices and apparatus for this purpose.

Still a further object of the invention is to provide a thermal control apparatus for fuel cells or the like which is an improvement over the apparatus disclosed in the aforementioned U.S. Pat. No. 3,441,444.

In achievement of these objectives, there is provided in accordance with this invention an assembly of fuel cells or like source of electrical power having mounted on an outer surface of the fuel cell module interleaved sets of high and low thermal emissivity surfaces, in which one set of surfaces is stationary and the other set of surfaces is movable. Means are provided for sensing the thermal condition of the fuel cell module and for moving one set of surfaces relative to the other set of surfaces to vary the thermal radiation from the fuel cell module and thus to control the temperature of the fuel cell module. The apparatus of the invention, while not restricted thereto, has particular utility for operation under space vacuum conditions.

Further objects and advantages of the invention will become apparent from the following description taken in conjunction with the accompanying drawings in which:

BRIEF DESCRIPTION OF THE DRAWINGS

FIG. 1 is a perspective isometric view of a fuel cell module provided with the temperature modulating arrangement of the invention;

FIG. 2 is a view in vertical section of the fuel cell module of FIG. 1;

FIG. 3 is enlarged view in vertical section showing the relation of the movable strip and fixed fin assembly, with the movable strips shown in overlying relation outwardly of the fixed fins to provide minimum thermal emissivity;

FIG. 4 is a fragmentary exploded view showing the thermal support plate with fins of high thermal emissivity attached thereto, and also showing the adjustably movable structure embodying the strips of low thermal emissivity which are movable into overlying relation to the fins of high thermal emissivity;

DESCRIPTION OF THE PREFERRED EMBODIMENT

Figure 5:
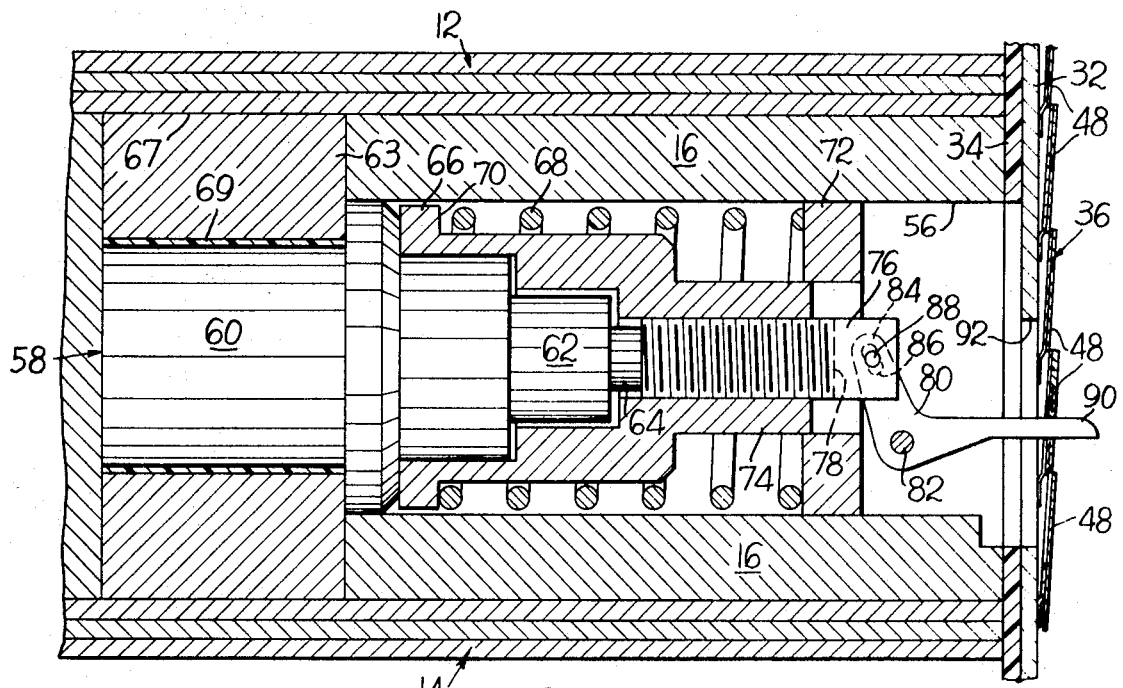
FIG. 5 is a view in cross section taken along line V—V of FIG. 1 showing details of the adjustable emissivity surfaces and of the thermally responsive actuating mechanism therefore, with the thermal responsive mechanism being shown in its relaxed position in which the thermally emissive surfaces are positioned at minimum emissivity.

Referring now to the drawings, there is shown a fuel cell assembly generally indicated at 10 including two groups of fuel cell stacks 12 and 14, respectively, separated by spacer plate 16. Spacer plate 16 is preferably formed of a suitable reinforced plastic material having good electrical insulating characteristics. The function of spacer plate 16 is to accommodate the temperature sensing and actuating mechanism to be described hereinafter. Each fuel cell stack is comprised of a plurality of individual fuel cells 18. The fuel cells 18 are pressed together by tie bolts 20 which pass through recessed holes in end plates 22, 24 and through aligned holes in the edges of the plates making up the fuel cell stacks. The tie bolts 20 are insulated from the fuel cell plates by insulating sleeves 26. End plates 22, 24 are preferably formed of reinforced plastic material. Suitable means are provided (not shown) for the supply and removal of reactants and exhaust products to and from the fuel cell module through suitable ports in the end plates 22 and 24.

To one or more of the outer edges of the end plates 22, 24 are attached, as by connecting screws 28, an adjustable thermally emissive surface assembly generally indicated at 30. Each assembly 30 includes a heat transfer panel 32. The heat transfer panel 32 is electrically insulated from the plates of the fuel cell stack by dielectric insulation 34. Arranged in vertically spaced relation on each heat transfer panel 32 are a plurality of fin members each generally indicated at 36. Heat transfer panel 32 transfers heat from the fuel cell module to fins 36. As best seen in FIG. 3, each fin member includes a lower edge portion 38 which is suitably attached, as by spot welding, for example, to the outer surface of the heat transfer panel 32. Each fin includes an inclined surface 40 which extends for a short distance outwardly from the lower edge portion 38 and a "front wall" portion 42 which extends upwardly from portion 40 in a plane which is inclined outwardly at a slight angle from a plane parallel to the outer surface of heat transfer panel 32. It can be seen that each fin 36 mounted and formed as just described defines what may be referred to as a "pocket" 44 between the inner surface of the "front wall" portion 42 of the fin and the outer surface of the heat transfer panel 32. The inclined portion 40 at the bottom of the fin above the welded edge 38 defines a "bottom" for the pocket 44. The pocket 44 is thus closed at the bottom by the fin portion 40 but is open at the top thereof for the entire length thereof, and is also open at the opposite ends thereof. The pocket 44 may therefore be described as being open ended and open topped.

Each of the fins 36 extends lengthwise for a substantial portion of the transverse width of the heat transfer panel 32.

The backing plate or heat transfer plate 32 is made of a lightweight material of high thermal conductivity such as aluminum or magnesium and the fins 36 are preferably formed of the same material as the heat transfer panel 32, since fins 36 should be formed of a material of high thermal conductivity. The outer surface of the "front wall" portion 42 of each fin 36 is coated on substantially the entire area thereof with a surface coating having high thermal emissivity, such as a suitable black paint, for example. As used in the specification and claims of this application, the terms "emissivity" and "thermal emissivity" mean "ability to radiate heat". The visible exposed surfaces of the heat transfer panel 32, such as the marginal edge portions 46 which lie between the fins 36 and the outer peripheral portions of the panel 32 are of a low thermal emissivity finish, as is also the remaining outer surface of the heat transfer panel.

Interleaved between the plurality of fins 36 are a plurality of movable strips 48 made of a material of low thermal conductivity and having a low emissivity finish on the outer face thereof. The movable strips 48 are preferably made of a suitable plastic material such as that known under the trademark "Mylar" and having a polished bright clean surface on the outer face thereof, which may be provided by a thin aluminized coating. Such a surface has low thermal radiation or emissivity. In the illustrated embodiment, the plurality of strips 48 are part of a common sheet of plastic material 50, and the strips 48 are formed by providing parallel slits or slots 52 which extend for a substantial portion of the transverse width of the sheet 50 except for the marginal edge portions 54, and define therebetween the strips 48. The entire outer surface of movable sheet 50, including the outer surfaces of all of the strips 48, is provided with the low thermal emissivity coating. Each strip 48 has dimensions such that when the strip is in maximum overlying relation to a fin 36 it substantially completely covers the outer surface of the front wall 42 of the fin 36; and when the strip 48 is in maximum underlying relation to a fin 36, it is substantially completely covered by the fin 36.

Figure 6:
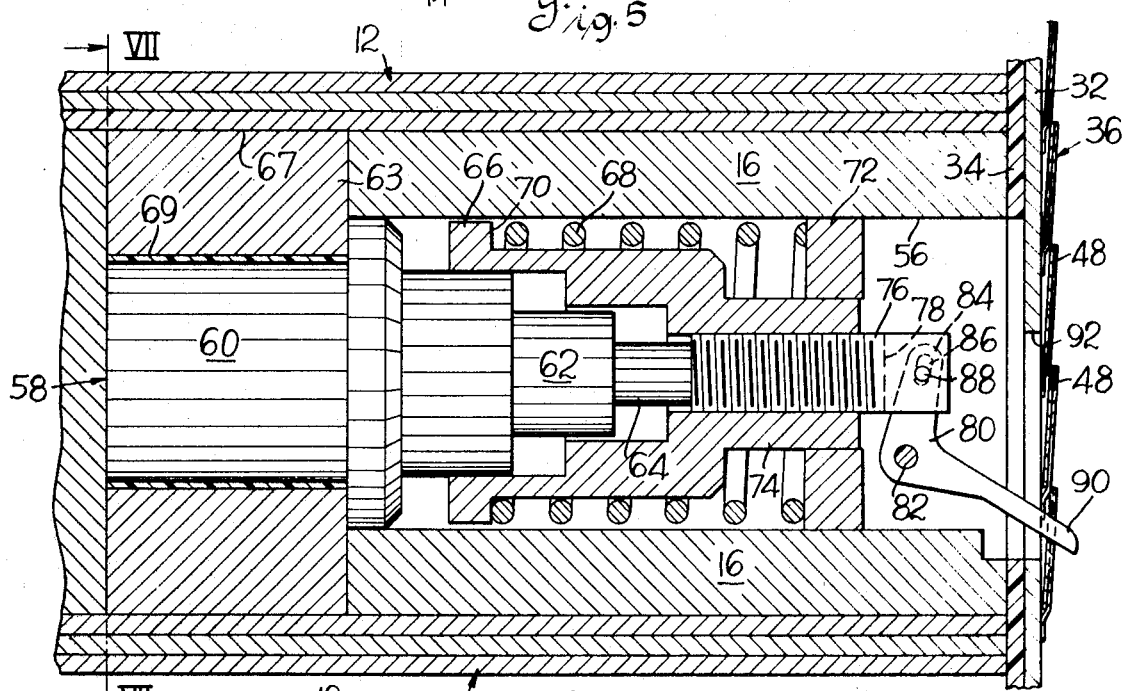
FIG. 6 is a view similar to Fig. 5, taken along section line V—V of FIG. 1, but in which the thermal responsive mechanism has moved to its maximum actuated position in which the thermally emissive surfaces are positioned for maximum heat emission.
Figure 7:
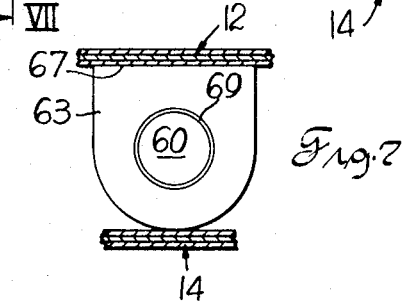
FIG. 7 is a view in section taken along line VII—VII of FIG. 6 showing the mounting arrangement for the thermal sensitive element of the actuating mechanism in a thermally conductive plug member which is in thermally conductive relation to the fuel cells.

The sheet 50 carrying the plurality of strips 48 is adapted to be assembled onto the plurality of fins 36 by slipping the slots 52 of the sheet 50 over the upper edges of the fins 36 to thereby cause the strips 48 to lie within the pockets 44 of the respective fins. The sheet 50 may be moved to one extreme position or downwardly with respect to the view shown in the drawings in which each movable strip 48 is almost completely received in a corresponding pocket 44 of a fin 36, and in which position the high emissivity outer surface of the front wall 42 of each fin is completely exposed. Such a position is shown in the view of FIG. 6. On the other hand the sheet 50 which carries the movable strips 48 may be moved to an opposite extreme position in which the low emissive strips 48 are in completely overlying position to the high emissive surfaces of front walls 42 of the fins 36 in which case the low emissive surfaces of the slidable strips 48 are substantially completely exposed. Such a position is shown in FIG. 5. Or, the movable strips 48 may lie in any intermediate position between the two extremes just described, in which case a part of the high emissivity surface of the front wall 42 of each respective member 36 is exposed, and a portion of the low emissivity surface of each strip 48 is exposed.

In order to move the movable strips 48 having the low emissivity outer surface to the proper position relative to the high emissivity surface of the respective front walls 42 of fins 36, a thermal sensing and associated actuating mechanism are provided as will now be described.

The spacer plate 16 between the fuel cell stacks 12 and 14 contains a bore or passage 56 which extends perpendicularly to the side of the fuel cell assembly 10 which is to be provided with an adjustable thermal control assembly of the type hereinbefore described. The fuel cell assembly 10 may be provided with an adjustable thermal assembly for each of the four vertical sides thereof or for any lesser number of sides as desired. A separate thermal sensing device and actuating mechanism is provided for each side provided with an adjustable thermal assembly, and is received in a corresponding bore 56.

Positioned within each bore 56 is a temperature sensitive actuator 58. Temperature sensitive actuator 58 is comprised of a thermal material container 60 at one end, and a neck 62 at the other end from which projects piston 64.

Thermal material container 60 is received in a bore or passage 65 in a heat conductive plug 63 which may be made, for example, of a metal such as copper having a good heat conduction characteristics. Plug 63 is provided at one end with a flat surface 67 which is in close thermal contact with the contiguous surface of stack 12 of fuel cells 18. Plug 63 may also contact the contiguous surface of stack 14, assuming the said contiguous surfaces of stacks 12 and 14 are at the same electrical potential. To insure maximum thermal contaCT between plug 63 and thermal material container 60, a suitable heat sink compound indicated at 60 may be disposed at the interface between members 60 and 63. A suitable heat sink compound is Dow Corning Type 340, as described on page 530 of Allied Industrial Electronics Catalog 1969, published by Allied Electronics (Subsidiary of Allied Radio Corporation) 100 North Western Avenue, Chicago, Ill. 60680.

The thermal material contained in container 60 comprises any suitable material such as paraffin wax which expands and contracts at a controlled rate over a specific temperature range. Expansion of the thermal material in container 60 forces the piston 64 out of the neck 62 of the thermal actuator 58. Temperature sensitive actuators 58 of the type employed in the embodiment of the present invention illustrated in the drawings, are available on the market under the registered trademark "ELAC" manufactured by Standard-Thompson Mass. Waltham, Massachusetts. Spring retainer 66 is slidably mounted over neck 62 and piston 64. Compression spring 68 is concentrically disposed about spring retainer 66, one end of the spring 68 being biased against flange 70 of spring retainer 66. Spring stop 72 is threaded into spacer plate 16 and preloads and retains spring 68. Collar 74 of spring retainer 66 is slidably movable within a passage or bore in spring stop 72.

Adjustment screw 76 is threaded into collar 74 of retainer 66 and is adapted to be contacted at the inner end thereof by piston 64 of actuator 58. The adjusting screw 76 is provided at the forward or right-hand end thereof with respect to the views shown in FIGS. 5 and 6 with a bifurcated end portion 78 which adapts screw 76 for clevislike connection to bellcrank lever 80.

The bellcrank lever generally indicated at 80 is adapted to be actuated by movement of the piston 64 of the thermal actuator 58 as will now be described. The bellcrank 80 is supported for pivotal movement by spacer plate 16 at point 82 and includes an arm 84 received between the bifurcated ends of adjusting screw 76. Arm 84 has a slot 86 therein which receives a pin 88 carried by the forward bifurcated end of the adjusting screw 76, whereby movement of the adjusting screw 76 and of the spring retainer 66 caused by movement of piston 64, imparts a pivotal movement to bellcrank 80 about its pivot point 82.

Bellcrank 80 is also provided with an arm 90 which extends through a passage 92 in heat transfer panel 32. The arm 90 also passes through a slot or passage 94 provided in a pair of adjacent or contiguous fins 36, and through a slot 96 provided in one of the strips 48 carried by the movable strip carrying sheet 50. As best seen in the view of FIG. 4, the region of the movable strip 48 through which the passage 96 extends is reinforced by an extra thickness of material as indicated at 98 to provide a mechanical strengthening or reinforcement of the strip 48 in the region where it is engaged by the actuator arm 90 of the bellcrank 80.

The operation of the temperature sensing modulating apparatus of the fuel cell module will now be described. Referring now to FIG. 5, it will be noted that in the view of FIG. 5, the piston 64 of the thermal sensitive actuator 58 is in its relaxed or completely retracted position in which the spring retainer 66 is in its extreme retracted position to the left with respect to the view shown in the drawings. In this retracted or relaxed position of the thermal actuator 58 shown in FIG. 5, the arm 84 of bellcrank 80 is in its maximum counterclockwise position with respect to the view shown in the drawings, and the arm 90 of the bellcrank 80 is in a substantially horizontal position relative to the view of the drawings. In this position of the arm 90 of the bellcrank, the arm 90 is in a position in which the low thermal emissivity strips 48 are elevated to their maximum vertical height or position in which they are in substantially completely overlying relation to the high thermal emissivity outer surfaces of the front walls 42 of the stationary fins 36. In this position of the thermal modulating assembly, all of the high emissivity surfaces of the thermal assembly provided by the outer surfaces of front walls 42 of fins 36 are concealed or covered by the low emissivity outer surfaces of the movable strips 48. In this position of the thermal modulating assembly therefore, minimum thermal emissivity or radiation of the assembly is provided and maximum heat retention is provided. This position of the thermal actuating assembly would correspond to the starting condition of the fuel cells when they have just been energized, in which case, the fuel cell module has not yet heated up to any appreciable extent.

During operation of the fuel module, as the fuel cell stack warms up to exceed the selected lower limit for optimum operating temperature, for example, 195° F., the temperature rise causes the thermal material in the temperature sensitive actuator 58 to expand. Expansion of the thermal material in the temperature sensitive actuator 58 causes the piston 64 to move outwardly against adjustment screw 70. This causes spring retainer 66 to move to the right, compressing spring 68 and forcing adjustment screw 76 to the right, all with respect to the views shown in FIGS. 5 and 6. Movement of screw 76 to the right as seen in FIGS. 5 and 6 causes bellcrank 80 to pivot in a clockwise direction about pivot point 82. This causes downward movement of strip-carrying sheet 50 and strips 48 carried thereby, the strips 48 moving down into the pockets 44 defined by fins 36. Depending upon the degree of movement of strips 48 into pockets 44, a predetermined area of the high thermally emissive surface of the respective front walls 42 of fins 36 becomes exposed, providing a corresponding degree of increased thermal emission or radiation. If the fuel cell stack is sufficiently warm, the strips 48 may be moved to the extreme position in which they are substantially completely received within the pockets 44.

As the dissipation of heat through the heat dissipating surfaces 36 causes the temperature to fall within the module, or the internal heat generation of the module is reduced by a lowering of the electrical power output of the fuel cell stack, the thermal sensitive material within the thermal actuator 58 contracts and piston 64 is moved by spring 68 inwardly or to the left with respect to the views of FIGS. 5 and 6. Spring retainer 66 moves inwardly or to the left retracting the adjustment screw 56 to the left with respect to the views of FIGS. 5 and 6, causing the bellcrank lever 80 to move about its pivot point 82 in a direction which causes the arm 90 to move in an upward or counterclockwise direction with respect to the views of FIGS. 5 and 6 to approach the position shown in FIG. 5, thereby moving the movable strips 48 upwardly into at least partially overlying relation with respect to the high emissivity surfaces of the forward walls 42 of fins 36, thereby reducing the heat emission.

While the heat transfer panel 32 and attached fins 36 have been shown and described as being stationary and the sheet 50 carrying strips 48 has been shown and described as being movable, it would be possible, although less desirable, to have the heat transfer panel 32 and attached fins 36 as the movable structure, with the sheet 50 carrying strips 48 as the stationary structure. The thermal conductivity and thermal emission characteristics of the various elements would remain the same as previously described.

From the foregoing detailed description of the present invention it has been shown how the objects of the invention have been attained in a preferred manner. However, modifications and equivalents of the disclosed concepts such as readily occur to those skilled in the art are intended to be included within the scope of this invention.

The embodiments of the invention in which an exclusive property or privilege is claimed or defined as follows:

1. In combination, an electrical power supply device requiring controlled heat dissipation therefrom, interleaved sets of high thermal emissivity surfaces and low thermal emissivity surfaces mounted on said device for movement relative to each other whereby to change the relative exposed areas of said high and low emissivity surfaces, said sets of interleaved surfaces being telescopically movable relative to each other from a maximum position in one direction in which one of said sets of surfaces is substantially completely covered by the other of said sets of surfaces, through a plurality of intermediate positions in which said one set of surfaces is partially covered by and also partially covers said other set of surfaces, to a maximum position in the opposite direction in which said one set of surfaces substantially completely covers said other set of surfaces, sensing means for sensing the temperature condition of said device, and means actuated by said sensing means to move said sets of surfaces relative to each other.

2. In combination, an electrical power supply device requiring controlled heat dissipation therefrom, interleaved sets of high thermal emissivity surfaces and low thermal emissivity surfaces mounted on said device for movement relative to each other whereby to change the relative exposed areas of said high and low emissivity surfaces, one set of surfaces being movable to a maximum position in one direction relative to the other set of surfaces in which said one set of surfaces substantially completely covers said other set of surfaces and substantially only said one set of surfaces is effective for thermal radiation, and said one set of surfaces being movable to a maximum position in the opposite direction relative to said other set of surfaces in which said other set of surfaces substantially completely covers said one set of surfaces and substantially only said other set of surfaces is effective for thermal radiation, sensing means for sensing the temperature condition of said device, and means actuated by said sensing means to move said sets of surfaces relative to each other.

3. In combination, an electrical power supply device requiring controlled heat dissipation therefrom, interleaved sets of high thermal emissivity surfaces and low thermal emissivity surfaces mounted on said device for movement relative to each other whereby to change the relative exposed areas of said high and low emissivity surfaces, a plurality of spaced fin members supported on said device, a plurality of strip members, the outer surfaces of said fin members constituting one of said sets of surfaces, the outer surfaces of said strip members constituting the other of said sets of surfaces, said strip members and said fin members being movable relative to each other in one direction whereby to move said strip members out of overlying relation to the outer surfaces of said fin members and into underlying relation to said fin members, said strip members and said fin members being movable relative to each other in the opposite direction whereby to move said strip members out of underlying relation to said fin members and into overlying relation to the outer surfaces of said fin members, sensing means for sensing the temperature condition of said device, and means actuated by said sensing means to move said sets of surfaces relative to each other.

4. The combination defined in claim 3 in which the outer surfaces of said fin members have a surface finish having high thermal emissivity and the outer surfaces of said strip members have a surface finish of low thermal emissivity.

5. The combination defined in claim 3 in which the outer surfaces of said fin members have a surface finish having high thermal emissivity and said fin members are formed of a material of high thermal conductivity.

6. In combination, an electrical power supply device requiring controlled heat dissipation therefrom, interleaved sets of high thermal emissivity surfaces and low thermal emissivity surfaces mounted on said device for movement relative to each other whereby to change the relative exposed areas of said high and low emissivity surfaces, a plurality of spaced fin members supported on said device, said fin members being positioned to define open pockets, a plurality of strip members, the outer surfaces of said fin members constituting one of said sets of surfaces, the outer surfaces of said strip members constituting the other of said sets of surfaces, said strip members and said fin members being movable relative to each other in one direction whereby to move said strip members out of overlying relation to said outer surfaces of said fin members and into said pockets defined by said fin members to thereby render the uncovered portions of said outer surfaces of said fin members effective for thermal radiation and whereby to render the portions of said strip members in said pockets ineffective for thermal radiation, said strip members and said fin members being movable relative to each other in an opposite direction whereby to move said strip members out of said pockets into covered overlying relation to the outer surfaces of said fin members to thereby render the covered outer surfaces of said fin members ineffective for thermal radiation and whereby to render the portions of said strip members in overlying relation to said fin members effective for thermal radiation, sensing means for sensing the temperature condition of said device, and means actuated by said sensing means to move said sets of surfaces relative to each other.

7. An apparatus adapted for mounting on a device to provide controlled heat dissipation from said device comprising interleaved sets of high thermal emissivity surfaces and low thermal emissivity surfaces mounted for movement relative to each other whereby to change the relative exposed areas of said high and low emissivity surfaces, said sets of interleaved surfaces being telescopically movable relative to each other from a maximum position in one direction in which one of said sets of surfaces is substantially completely covered by the other of said sets of surfaces, through a plurality of intermediate positions in which said one set of surfaces is partially covered by and also partially covers said other set of surfaces, to a maximum position in the opposite direction in which said one set of surfaces substantially completely covers said other set of surfaces, sensing means for sensing the temperature condition of said device, and means actuated by said sensing means to move said sets of surfaces relative to each other.

8. An apparatus adapted for mounting on a device to provide controlled heat dissipation from said device comprising interleaved sets of high thermal emissivity surfaces and low thermal emissivity surfaces mounted for movement relative to each other whereby to change the relative exposed areas of said high and low emissivity surfaces, one set of surfaces being movable to a maximum position in one direction relative to the other set of surfaces in which said one set of surfaces substantially completely covers said other set of surfaces and substantially only said one set of surfaces is effective for thermal radiation, and said one set of surfaces being movable to a maximum position in the opposite direction relative to said other set of surfaces in which said other set of surfaces substantially completely covers said one set of surfaces and substantially only said other set of surfaces is effective for thermal radiation, sensing means for sensing the temperature condition of said device, and means actuated by said sensing means to move said sets of surfaces relative to each other.

9. An apparatus adapted for mounting on a device to provide controlled heat dissipation from said device comprising interleaved sets of high thermal emissivity surfaces and low thermal emissivity surfaces mounted for movement relative to each other whereby to change the relative exposed areas of said high and low emissivity surfaces, a plurality of spaced fin members adapted to be supported on said device, a plurality of strip members, the outer surfaces of said fin members constituting one of said sets of surfaces, the outer surfaces of said strip members constituting the other of said sets of surfaces, said strip members and said fin members being movable relative to each other in one direction whereby to move said strip members out of overlying relation to the outer surfaces of said fin members and into underlying relation to said fin members, said strip members and said fin members being movable relative to each other in the opposite direction whereby to move said strip members out of underlying relation to said fin members and into overlying relation to the outer surfaces of said fin members, sensing means for sensing the temperature condition of said device, and means actuated by said sensing means to move said sets of surfaces relative to each other.

* * * * *